(12) United States Patent
Boyle

(10) Patent No.: US 10,282,096 B1
(45) Date of Patent: May 7, 2019

(54) IDENTIFICATION OF DATA WITH PREDETERMINED DATA PATTERN

(71) Applicant: Western Digital Technologies, Inc., Irvine, CA (US)

(72) Inventor: William B. Boyle, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 196 days.

(21) Appl. No.: 14/574,123

(22) Filed: Dec. 17, 2014

(51) Int. Cl.
*G06F 3/06* (2006.01)
*G06F 12/06* (2006.01)
*G06F 12/02* (2006.01)

(52) U.S. Cl.
CPC .......... *G06F 3/0608* (2013.01); *G06F 3/0638* (2013.01); *G06F 3/0676* (2013.01); *G06F 3/0679* (2013.01); *G06F 12/0253* (2013.01); *G06F 12/0653* (2013.01); *G06F 2212/1044* (2013.01); *G06F 2212/205* (2013.01)

(58) Field of Classification Search
CPC ......... G06F 12/0246; G06F 2212/7201; G06F 3/0608; G06F 3/061; G06F 3/0641; G06F 2212/7205; G06F 3/0632; G06F 3/064; G06F 12/0238; G06F 2212/1036; G06F 11/1469
See application file for complete search history.

(56) References Cited

U.S. PATENT DOCUMENTS

| | | |
|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |

(Continued)

*Primary Examiner* — Reginald D Bragdon
*Assistant Examiner* — Thanh D Vo
(74) *Attorney, Agent, or Firm* — Barry IP Law, P.C.

(57) ABSTRACT

Managing data stored in a Data Storage Device (DSD) including a memory. A translation table is maintained mapping logical addresses for data to physical addresses corresponding to a location where the data is stored in the memory. A data pattern is identified of particular data to be stored in the memory or of particular data already stored in the memory, and it is indicated in the translation table that at least one logical address for the particular data is associated with the data pattern.

34 Claims, 6 Drawing Sheets

(56) References Cited

U.S. PATENT DOCUMENTS

| | | |
|---|---|---|
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,725,392 B1 * | 4/2004 | Frey .................... G06F 11/1076 714/15 |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |

(56) References Cited

U.S. PATENT DOCUMENTS

| | | |
|---|---|---|
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |

(56) References Cited

U.S. PATENT DOCUMENTS

| | | |
|---|---|---|
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,189 B2 | 2/2014 | Post et al. |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2009/0089518 A1* | 4/2009 | Hobbet ............... G06F 3/0608 711/155 |
| 2009/0113702 A1 | 5/2009 | Hogg |
| 2010/0306551 A1 | 12/2010 | Meyer et al. |
| 2011/0119455 A1* | 5/2011 | Tsai ................... G06F 3/0608 711/154 |
| 2011/0208901 A1* | 8/2011 | Kim .................. G06F 12/0246 711/103 |
| 2011/0226729 A1 | 9/2011 | Hogg |
| 2012/0110249 A1 | 5/2012 | Jeong et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0135767 A1 | 5/2013 | Hall et al. |
| 2014/0136764 A1* | 5/2014 | Li ....................... G11C 16/08 711/103 |
| 2014/0195725 A1 | 7/2014 | Bennett |
| 2014/0201424 A1 | 7/2014 | Chen et al. |
| 2014/0289451 A1* | 9/2014 | Ho ................... G06F 12/0246 711/103 |
| 2015/0293840 A1* | 10/2015 | Chen ................ G06F 12/0246 711/103 |
| 2016/0085671 A1* | 3/2016 | Zhang ................. G11C 5/025 711/103 |

* cited by examiner

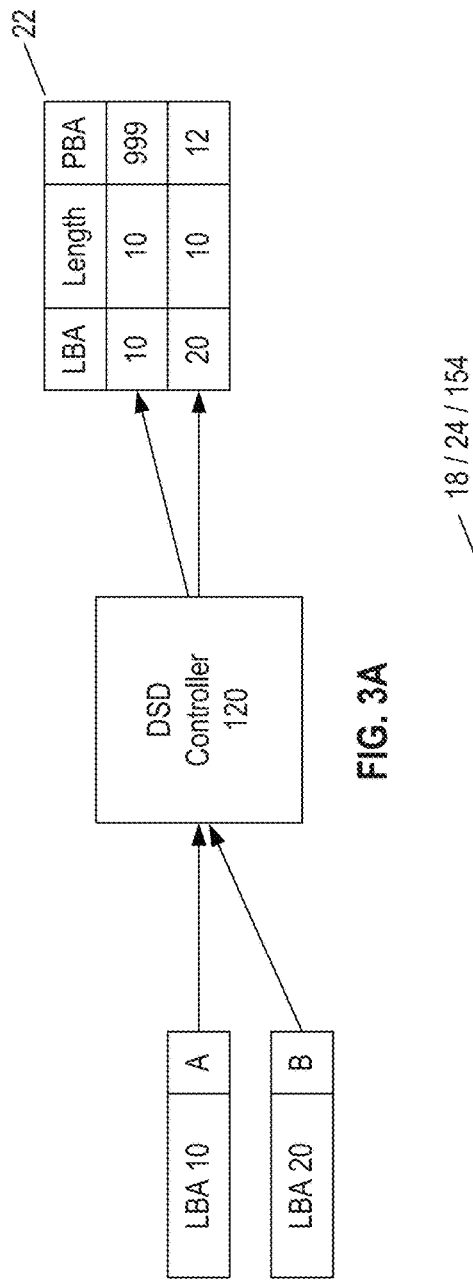
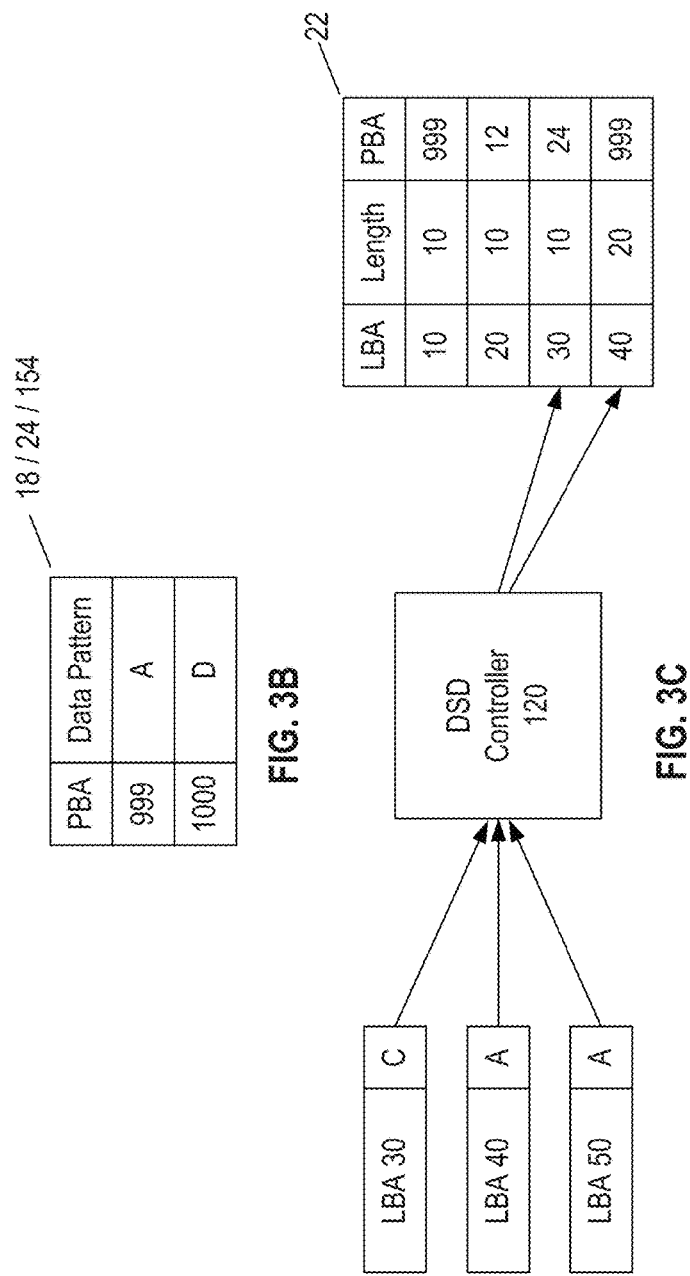
FIG. 3A
FIG. 3B
FIG. 3C

IDENTIFICATION OF DATA WITH PREDETERMINED DATA PATTERN

BACKGROUND

Data Storage Devices (DSDs) are often used to record data onto or to reproduce data from storage media. DSDs can include different types of storage media, such as solid-state memory (e.g., flash memory) or a rotating magnetic disk. For such storage media, the DSD may use a logical to physical mapping that maps logical addresses for data to physical addresses indicating where the data is stored on the storage media.

In the case of solid-state memory, the DSD may use an indirection system to facilitate the rewriting of data associated with a particular logical address at different physical locations on the storage media. Such an indirection system may, for example, provide for wear leveling so that the solid-state memory is more evenly used to prolong a usable life of the solid-state memory.

A disk storage media may also use an indirection system to facilitate the rewriting of data associated with a particular logical address at different physical locations on the storage media. Such an indirection system may, for example, provide for sequential writing on the disk so that tracks can be written in an overlapping pattern using Shingled Magnetic Recording (SMR) to increase the amount of data stored in a given area on the disk. In such SMR DSDs, data is generally written sequentially to avoid rewriting an overlapped track on the disk since such rewriting would also adversely affect data written in an adjacent track.

Since the data capacity of storage media is generally limited, there is a need to conserve the physical space used for storing data on the storage media. This need is heightened for DSDs using an indirection system where data associated with a particular logical address is not rewritten in the same physical location on the storage media. The conservation of physical storage space typically becomes more important for such storage media since invalid or previous versions of data often remain in their old physical locations on the storage media until a maintenance operation such as garbage collection is performed to reclaim the portions of the storage media storing the invalid or obsolete data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 3A is a conceptual diagram providing an example of the identification of a data pattern and the modification of a translation table to indicate that the data is associated with the data pattern according to an embodiment.

FIG. 3B is a conceptual diagram providing an example of data patterns stored in a memory according to an embodiment.

FIG. 3C is a conceptual diagram providing an example of the identification of the data pattern of FIG. 3A and further modification of the translation table of FIG. 3A according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Overview of Example System Environment

Figure 1:
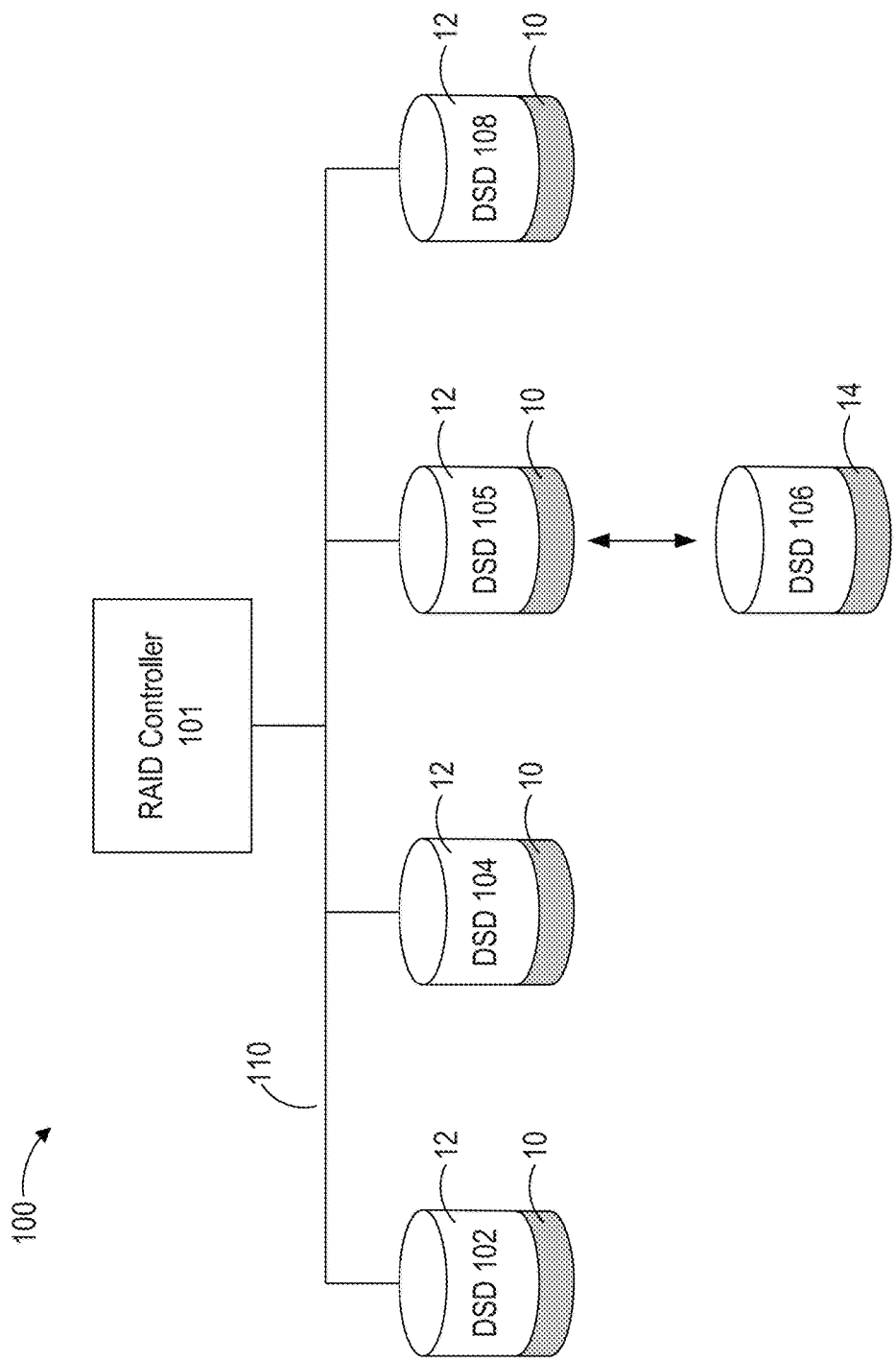
FIG. 1 is a block diagram depicting a data storage system including a Redundant Array of Independent Disks (RAID) according to an embodiment.

FIG. 1 shows data storage system 100 according to an embodiment which includes Redundant Array of Independent Disks (RAID) controller 101 in communication with Data Storage Devices (DSDs) 102, 104, 105, and 108 via communication bus 110. System 100 can be, for example, a data center storage system or a cloud-based storage system. In this regard, data storage system 100 may be a stand-alone system or part of a network, which can, for example, be a local or wide area network, or the Internet. In addition, RAID controller 101 and DSDs 102, 104, 105, and 108 need not be physically in the same location.

Those of ordinary skill in the art will appreciate that system 100 can include more or less than those elements shown in FIG. 1 and that the disclosed processes can be implemented in other environments In the example embodiment of FIG. 1, RAID controller 101 can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. RAID controller 101 communicates with each of DSDs 102, 104, 105, and 108 to direct the storage of data among DSDs 102, 104, 105, and 108. As will be appreciated by those of ordinary skill in the art, RAID controller 101 may use a particular storage scheme or RAID level (e.g., RAID 0, 1, 5, 6) in determining which data to store on which DSD. The various storage schemes may provide for data redundancy and/or improved performance in accessing data from system 100.

Each of DSDs 102, 104, 105, and 108 can include storage media such as rotating magnetic disks and/or solid-state memory for storing data. As shown in the example of FIG. 1, each of DSDs 102, 104, 105, and 108 store approximately the same amount of data as indicated by the grey shading at the bottom of each of DSDs 102, 104, 105, and 108.

In the example of FIG. 1, DSD 105 is replaced by DSD 106. The replacement of DSD 105 may be due to a failure of DSD 105 or as a preventive measure to protect against the loss of data. When replacing DSD 105 with DSD 106, the data of DSDs 102, 104, and 108 can be used to reconstruct the data of DSD 105 in DSD 106 as part of a DSD rebuild process. As shown in FIG. 1, each of DSDs 102, 104, 105, and 108 includes a used portion 10 and an unused portion 12. In conventional rebuild processes, both used portion 10 and unused portion 12 would be used to generate data 14 for DSD 106 since neither a conventional RAID controller or DSD controller would recognize the difference between unused portions 12 and used portions 10. The conventional RAID rebuild process described above has a detrimental effect since it causes the additional consumption of the physical storage media of DSD 106. Such a RAID rebuild process can also add entries to a translation table used by DSD 106 for mapping logical addresses for unused portion 12 to physical addresses indicating storage locations in DSD 106.

In addition, the disproportionate consumption of physical media in DSD 106 relative to the other DSDs 102, 104, and 108 can create an imbalance of a garbage collection load across the DSDs when the rebuild operation is complete. As noted above, garbage collection can be performed to reclaim portions of the storage media storing invalid or obsolete data. In this case, the storage of data generated from unused portions 12 reduces the amount of free space available in DSD 106 and can increase the urgency for performing garbage collection.

The present disclosure provides for identifying a data pattern of particular data to be stored or already stored and indicating that the particular data is associated with the data pattern in a translation table. This arrangement ordinarily allows for a quicker rebuild process since unused portions 12 can be identified and do not need to be used to generate data for storage in DSD 106. The foregoing arrangement also allows for more over-provisioning with more unused space in DSD 106, which can improve the performance of DSD 106. In addition, the data pattern identification processes discussed below can ordinarily improve garbage collection by leveling the amount of data stored across the DSDs and decreasing the overall amount of garbage collection needed.

Although an example of a RAID rebuild process is provided in FIG. 1, other example applications exist where the disclosed data pattern identification processes can prevent invalid data from being written to a DSD. One example application is a full formatting of a Hard Disk Drive (HDD) using an operating system. In a conventional full formatting, the operating system scans for defective portions of the storage media by attempting to access each physical location on the storage media. The accessed data is rewritten to the storage media with zeros written to the storage media for the unused portions that were accessed.

By identifying a particular pattern of data, such as a pattern of all zeros, the formatting process can be performed quicker and consume less physical space on the storage media. For DSDs using an indirection system where data associated with a particular logical address is not rewritten in the same physical location, less garbage collection will ordinarily need to be performed. When garbage collection is performed, it can be done more efficiently since there is more free space available in the storage media.

Figure 2:
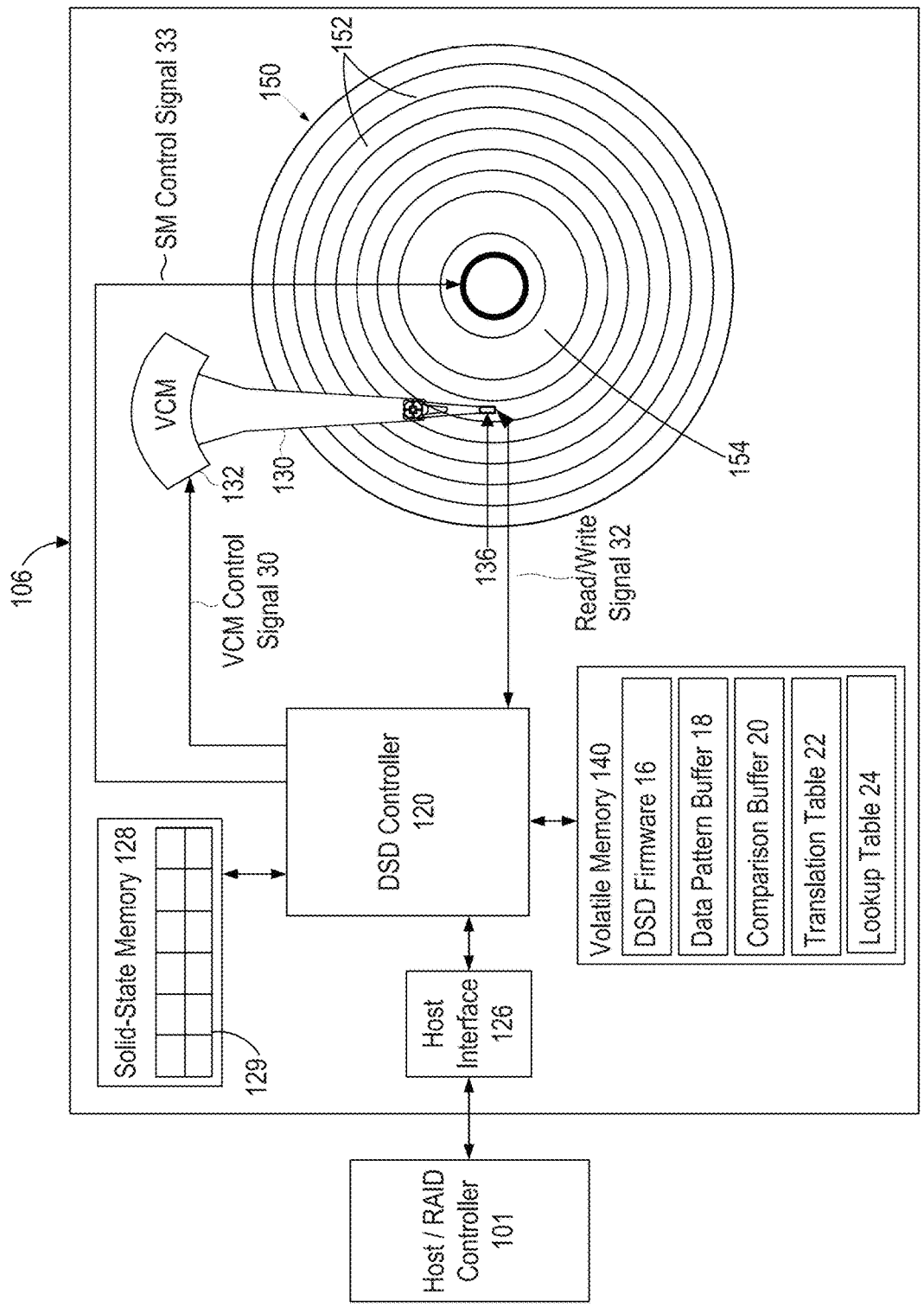
FIG. 2 is a block diagram depicting a Data Storage Device (DSD) of FIG. 1 according to an embodiment.

FIG. 2 depicts a block diagram of DSD 106 according to an embodiment. In the embodiment of FIG. 2, DSD 106 is a Solid-State Hybrid Drive (SSHD) with a first storage media including magnetic recording media (e.g., disks in disk pack 150) and a second storage media including a solid-state media (e.g., solid-state memory 128). In other embodiments, each of disk pack 150 or solid-state memory 128 may be replaced by multiple HDDs or multiple Solid-State Drives (SSDs), respectively, so that DSD 106 includes pools of HDDs and/or SSDs. In addition, DSD 106 in other embodiments can include different types of recording media or may only include solid-state memory 128 or disk pack 150.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

DSD 106 includes DSD controller 120 which includes circuitry such as one or more processors for executing instructions and can include a microcontroller, a DSP, an ASIC, an FPGA, hard-wired logic, analog circuitry and/or a combination thereof. In one implementation, DSD controller 120 can include a system on a chip (SoC). In one embodiment, an SSD controller may be utilized that operates in conjunction with DSD controller 120 for controlling operation of solid-state memory 128.

Host interface 126 is configured to interface DSD 106 with RAID controller 101 and may interface according to a standard such as, for example, PCIe, SATA, or SAS. In a non-RAID environment, DSD 106 may communicate with a host, such as a host computer, instead of RAID controller 101 using host interface 126. As will be appreciated by those of ordinary skill in the art, host interface 126 can be included as part of controller 120. Although FIGS. 1 and 2 depict the co-location of RAID controller 101 and DSD 106, in other embodiments the two need not be physically co-located. In such embodiments, DSD 106 may be located remotely from RAID controller 101 and connected to RAID controller 101 via a network interface.

In the example of FIG. 2, the first memory of DSD 106 includes rotating magnetic disks arranged in disk pack 150 which is rotated by a spindle motor (not shown). DSD 106 also includes Head Stack Assembly (HSA) 136 connected to the distal end of actuator 130 which is rotated by Voice Coil Motor (VCM) 132 to position HSA 136 in relation to disk pack 150. DSD controller 120 can include servo control circuitry (not shown) to control the position of HSA 136 and the rotation of disk pack 150 using VCM control signal 30 and SM control signal 33, respectively.

Disk pack 150 comprises multiple disks that are radially aligned so as to rotate about a spindle motor. Each disk in disk pack 150 includes a number of radially spaced, concentric tracks 152 for storing data. HSA 136 includes multiple heads each arranged to read data from and write data to a corresponding surface of a disk in disk pack 150.

In some implementations, tracks 152 may overlap as a result of Shingled Magnetic Recording (SMR). SMR can provide a way of increasing the amount of data that can be stored in a given area on a disk by increasing the number of Tracks Per Inch (TPI). SMR increases TPI by using a relatively wide shingle write head to overlap tracks like roof shingles. The non-overlapping portion then serves as a narrow track that can be read by a narrower read head.

Although a higher number of TPI is ordinarily possible with SMR, the overlap in tracks can create a problem when writing data since new writes to a previously overlapped track affects data written in the overlapping track. For this reason, SMR tracks are generally sequentially written to avoid affecting previously written data.

Managing sequentially written data for SMR media typically includes the DSD using an indirection system to translate between different addressing schemes to ensure that data is sequentially written. When data is modified for a particular Logical Block Address (LBA), the indirection system allows the DSD to sequentially write the modified data to a new location and remap the LBA for the data to the new location. The old version of the data at the previous location becomes obsolete or invalid data.

In other implementations, tracks 152 may not overlap with SMR, but indirection may still be used to manage data stored in disk pack 150. One such example can involve using indirection to manage data stored in a media cache where physical addresses for certain data may be redirected to a location in the media cache storing a copy of the data.

Disk pack 150 also includes reserved area 154 which can be reserved for storing data patterns. As discussed in more detail below, one or more data patterns can be stored in reserved area 154 without having to store multiple copies of the data pattern in other areas of disk pack 150. Reserved area 154 is shown near an inner diameter position of disk pack 150. In other embodiments, the location of reserved area 154 can vary. In one such embodiment, reserved area 154 can be located in solid-state memory 128.

In the example of FIG. 2, DSD 106 also includes volatile memory 140. Volatile memory 140 can include, for example, a Dynamic Random Access Memory (DRAM) which can be used by DSD 106 to temporarily store data. Data stored in volatile memory 140 can include data read from Non-Volatile Memories (NVMs) (which may include disk pack 150 and solid-state memory 128), data to be written to NVMs, instructions loaded from DSD firmware 16 for execution by DSD controller 120, and/or data used in executing DSD firmware 16.

In the example of FIG. 2, volatile memory 140 is shown as storing DSD firmware 16, data pattern buffer 18, comparison buffer 20, translation table 22, and lookup table 24. DSD firmware 16 includes computer-executable instructions that can be executed by DSD controller 120 to perform the data pattern identification processes discussed below and to control operation of DSD 106.

As described in more detail below, data pattern buffer 18 and comparison buffer 20 can be used in implementing the data pattern identification processes disclosed herein. In more detail, data pattern buffer 18 can store a data pattern to be identified and comparison buffer 20 can store data to be compared with the data pattern stored in data pattern buffer 18 to determine whether the data stored in comparison buffer 20 includes the data pattern.

Translation table 22 can be used as part of an indirection system for disk pack 150 and/or for solid-state memory 128 to allow for the reassignment of logical addresses to different physical locations. DSD controller 120 may use translation table 22 to map logical addresses such as LBAs to physical addresses corresponding to locations where data is stored in disk pack 150 and/or solid-state memory 128. Translation table 22 may also be copied to NVM such as disk pack 150 or solid-state memory 128 so that translation table 22 is available across power cycles of DSD 106.

Lookup table 24 can store data patterns or definitions for certain data patterns so that the data patterns can be accessed or referenced when needed, such as in response to a read command from a host or RAID controller 101. In other embodiments, the data patterns may only be stored in data pattern buffer 18 or reserved area 154. In this regard, other embodiments may include one or more of data pattern buffer 18, lookup table 24, and reserved area 154. In yet other embodiments, a data pattern can be encoded as part of DSD firmware 16, controller hardware, or stored as part of translation table 22 without storing the data pattern in data pattern buffer 18, lookup table 24, or reserved area 154 (or other non-volatile memory location).

Solid-state memory 128 may use indirection to provide wear-leveling of cells 129 so that the usage of cells 129 is more evenly distributed. DSD controller 120 may use translation table 22 to map LBAs for data stored in cells 129 to different physical locations. Modified data can then be written to a new physical location in solid-state memory 128 and the LBA for the modified data is remapped from a previous physical location to the new physical location.

In operation, host interface 126 receives read and write commands from a host or from RAID controller 101 via host interface 126 for reading data from and writing data to NVMs such as disk pack 150 and solid-state memory 128. In response to a write command, DSD controller 120 may buffer the data to be written for the write command in a buffer such as comparison buffer 20 of volatile memory 140.

For data to be written to disk pack 150, a read/write channel (not shown) of DSD controller 120 may then encode the buffered data into write signal 32 which is provided to a head of HSA 136 for magnetically writing data to a disk surface of disk pack 150.

In response to a read command for data stored on a disk surface of disk pack 150, DSD controller 120 controls a head of HSA 136 to magnetically read data stored on the surface of disk pack 150 and to send the read data as read signal 32. A read/write channel of DSD controller 120 can then decode and buffer the data into volatile memory 140 for transmission to a host or RAID controller 101 via host interface 126.

For data to be stored in solid-state memory 128, DSD controller 120 receives data from host interface 126 and may buffer the data in a buffer of volatile memory 140, such as comparison buffer 20. In one implementation, the data is then encoded into charge values for charging cells 129 of solid-state memory 128 to store the data.

In response to a read command for data stored in solid-state memory 128, DSD controller 120 in one implementation reads current values for cells 129 in solid-state memory 128 and decodes the current values into data that can be transferred or copied to a host or RAID controller 101. Such data may be buffered by DSD controller 120 before transferring or copying the data to a host or RAID controller 101 via host interface 126.

Data Pattern Identification Examples

FIG. 3A provides an example of the identification of a data pattern and a corresponding modification of translation table 22 to indicate that particular data is associated with the data pattern according to an embodiment. As shown in FIG. 3A, translation table 22 includes entries with a starting LBA, a length, and a starting Physical Block Address (PBA). The LBAs provide a logical address that may be used by a host or RAID controller 101 in identifying data, and the PBAs indicate a physical location in DSD 106 where the data for a particular LBA is stored. In other embodiments, translation table 22 may instead include ranges of LBAs and/or PBAs rather than providing a length with starting LBAs and starting PBAs.

In the example of FIG. 3A, DSD controller 120 receives one or more write commands to store data associated with LBAs 10 and 20. The data associated with LBA 10 has an A data pattern and the data associated with LBA 20 differs from data pattern A, denoted as data B for LBA 20.

In receiving the one or more write commands, DSD controller 120 stores the data for each of LBAs 10 and 20 in comparison buffer 20 of volatile memory 140 for comparison with one or more data patterns stored in data pattern buffer 18 before writing any of the data to an NVM such as disk pack 150 or solid-state memory 128. The data pattern can include an all zero pattern that may result from a RAID rebuild process or from a full format process of an operating system as described above. In other embodiments, the data pattern can differ, such as a data pattern of all ones, a consecutive data pattern, or a repeating sequence.

In the example of FIG. 3A, data pattern A matches a data pattern stored in data pattern buffer 18, but data B does not match a data pattern stored in data pattern buffer 18. DSD controller 120 indicates that the particular data for LBA 10 is associated with the data pattern by mapping LBA 10 to a predetermined value of 999 in translation table 22. LBA 20, on the other hand, is mapped to a PBA of 12 where the data for LBA 12 is stored in DSD 106.

In some implementations, the predetermined value can be, for example, a physical address beyond a range of available physical addresses in DSD 106 or provide a pointer to a definition for the data pattern in lookup table 24. In other implementations, the predetermined value can be a physical address for a location where the data pattern is stored in reserved area 154 or other area reserved for storing data patterns. In yet other implementations, the predetermined value can be a flag in translation table 22 that identifies the data pattern for DSD firmware 16. In one embodiment, translation table 22 may itself store the data pattern.

By identifying the data pattern for LBA 10, DSD controller 120 can avoid having to write data that may be invalid or repeatedly write the same data pattern, and thereby conserve storage space in DSD 106. As noted above, this can also reduce an amount of garbage collection needed for DSD 106 and more evenly spread garbage collection among a set of DSDs as in the RAID implementation of FIG. 1.

FIG. 3B provides an example of data patterns stored in a memory according to an embodiment. As shown in FIG. 3C, data patterns A and D are associated with PBAs 999 and 1,000. Depending on the implementation, FIG. 3C can represent any of data pattern buffer 18, lookup table 24, or reserved area 154. When data for an LBA associated with a data pattern (e.g., data pattern A or D) is requested, translation table 22 can direct DSD controller 120 to retrieve the data pattern from data pattern buffer 18, lookup table 24, or reserved area 154 using the PBA for the data pattern (e.g., PBA 999 or 1,000). In other embodiments, the data pattern may instead be included as part of DSD firmware 16.

FIG. 3C is a conceptual diagram providing an example of the identification of the A data pattern for subsequent write commands and the further modification of translation table 22 according to an embodiment. As shown in FIG. 3B, DSD controller 120 receives additional write commands to store data for LBAs 30, 40, and 50. The data for LBA 30 is denoted as C data, and the data for LBAs 40 and 50 has the A data pattern.

As in the example of FIG. 3A, DSD controller 120 indicates in translation table 22 that LBAs 40 and 50 are associated with the A data pattern. DSD controller 120 maps both LBA 40 and LBA 50 to the predetermined value of 999 in translation table by consolidating both LBAs into a single entry in translation table 22. As shown in FIG. 3B, LBA 30 is mapped to PBA 24, and LBA 40 is mapped to PBA 999. In addition, the length of the entry for LBA 40 is extended to 20 to cover LBA 50 since both LBAs map to the predetermined value of 999. In this way, DSD controller 120 is able to consolidate translation table 22 by using less entries.

Figure 4:
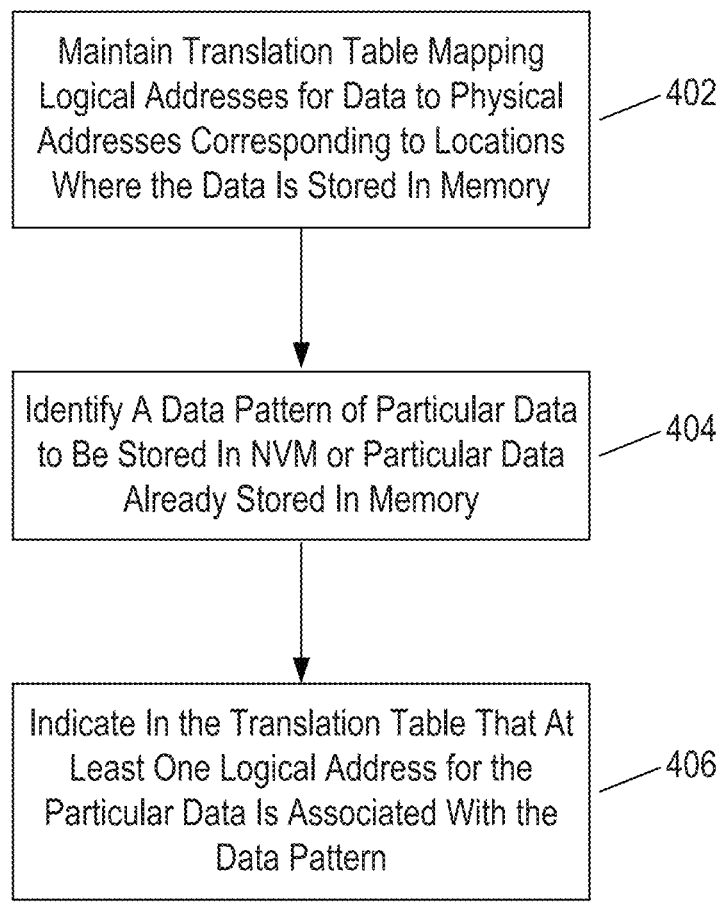
FIG. 4 is a flowchart for a data pattern identification process according to an embodiment.

FIG. 4 is a flowchart for a data pattern identification process that can be performed by DSD controller 120 executing DSD firmware 16 according to an embodiment. In block 402, DSD controller 120 maintains translation table 22 mapping logical addresses (e.g., LBAs) to physical addresses (e.g., PBAs) corresponding to locations where data for the logical addresses is stored in DSD 106. DSD controller 120 can maintain translation table 22 by updating translation table 22 to include new physical addresses for remapped logical addresses and adding new entries for newly written LBAs.

In block 404, DSD controller 120 identifies a data pattern of particular data to be stored in or already stored in a memory of DSD 106 such as disk pack 150 or solid-state memory 128. The identification of a data pattern for data already stored in the memory of DSD 106 can be associated with the performance of a maintenance operation of DSD 106 where data is read from the memory. Such an identification process is further described with reference to FIG. 6 below.

In block 406, DSD controller 120 indicates in translation table 22 that the particular data is associated with the data pattern. The indication in translation table 22 can include mapping one or more LBAs for the particular data to a predetermined value, as in the examples of FIGS. 3A and 3C.

Figure 5:
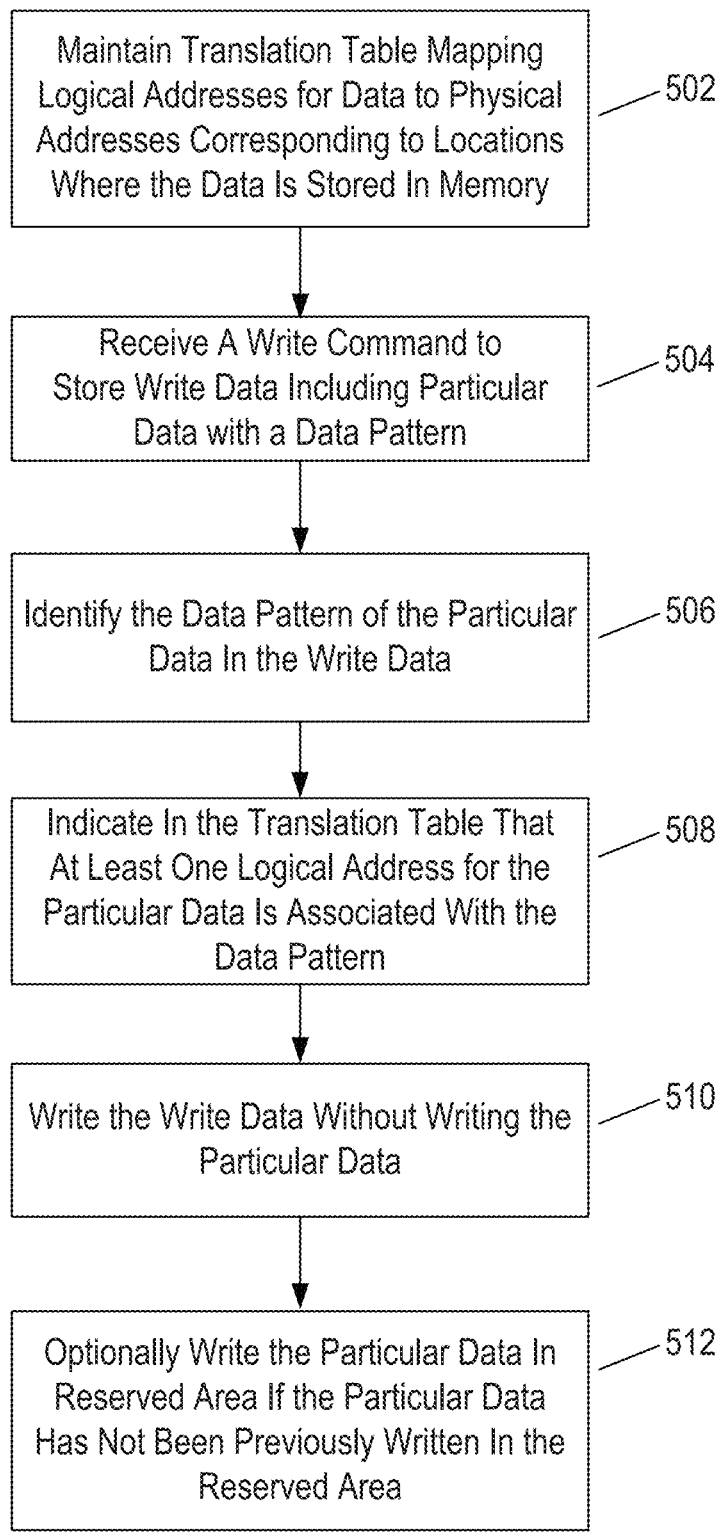
FIG. 5 is a flowchart for a data pattern identification process for data received from a write command according to an embodiment.

FIG. 5 is a flowchart for a data pattern identification process that can be performed by DSD controller 120 executing DSD firmware 16 according to an embodiment. The data identification process of FIG. 5 involves identifying a data pattern for particular data to be stored in DSD 106.

In block 502, DSD controller 120 maintains translation table 22 mapping logical addresses (e.g., LBAs) to physical addresses (e.g., PBAs) corresponding to locations where data for the logical addresses is stored in DSD 106. DSD controller 120 can maintain translation table 22 by updating translation table 22 to include new physical addresses for remapped logical addresses and adding new entries for newly written LBAs.

In block 504, DSD controller 120 receives a write command via host interface 126 to store write data including particular data with a data pattern. In block 506, DSD controller 120 identifies the data pattern of the particular data in the write data. This can be accomplished using data pattern buffer 18 and comparison buffer 20 as described above. In other embodiments, host interface 126 may identify the data pattern without involving DSD controller 120.

In block 508, DSD controller 120 indicates in translation table 22 that at least one logical address for the particular data is associated with the data pattern. The indication can include, for example, generating an entry in translation table 22 for the logical address of the particular data that is mapped to a predetermined value. In the example of FIG. 3A discussed above, DSD controller 120 indicates that the particular data for LBA 10 is associated with the data pattern by generating an entry for LBA 10 that is associated with the predetermined value of 999 for data pattern A.

In other examples, DSD controller 120 may indicate in translation table 22 that at least one logical address for the particular data is associated with the data pattern by modifying an existing entry in translation table 22. With reference to the example of FIG. 3B discussed above, DSD controller 120 may indicate that the particular data for an LBA 60 is associated with data pattern A by modifying the entry for LBA 40 to increase its length to 30 to cover LBA 60. LBAs 40 to 60 would then map to the predetermined value of 999 to indicate data pattern A.

In block 510, DSD controller 120 writes the write data in disk pack 150 or solid-state memory 128 without writing the particular data associated with the data pattern. In this regard, DSD controller 120 may not write the particular data if it is associated with a data pattern (e.g., all zeros) or if the data pattern is already stored in reserved area 154, lookup table 24, or other memory location, or encoded into DSD firmware 16 or controller hardware. In block 512, DSD controller 120 optionally controls HSA 136 to write the particular data in reserved area 154 if the particular data has not been previously written in reserved area 154.

By not having to write the particular data or by only having to write the particular data once, it is ordinarily possible to conserve storage space in DSD 106 and to improve a performance of DSD 106.

Figure 6:
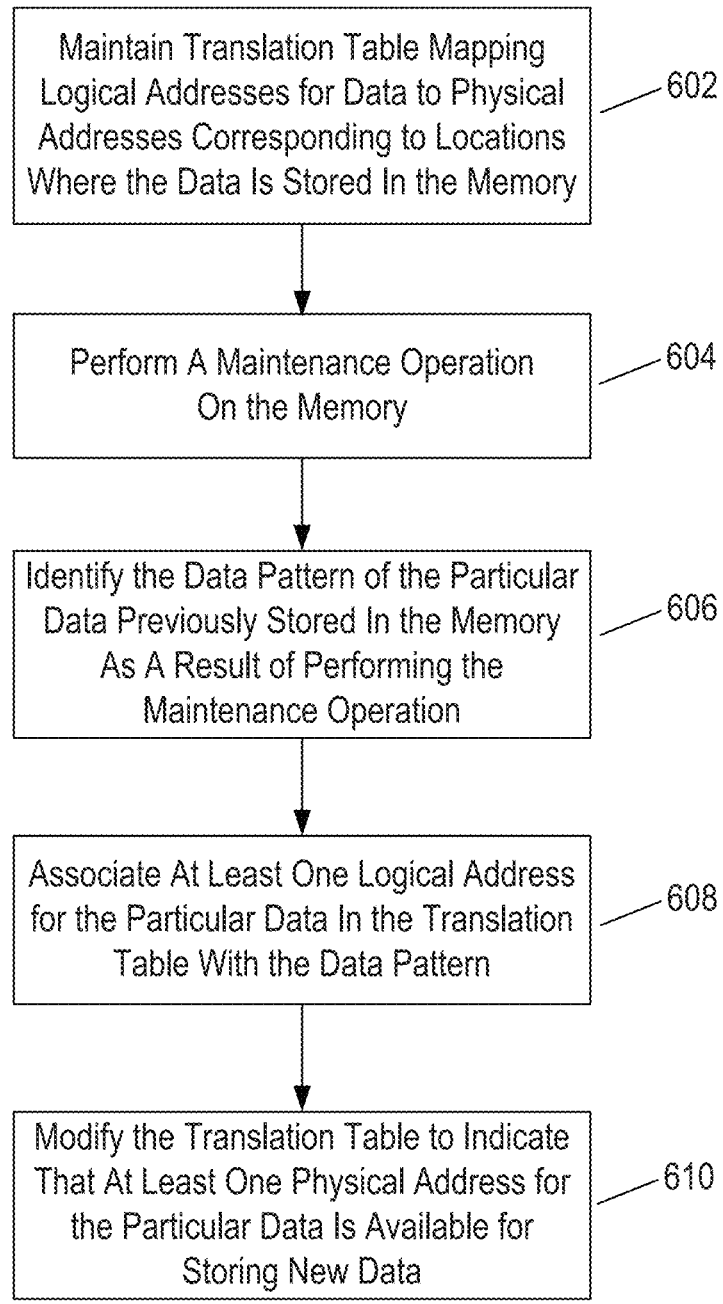
FIG. 6 is a flowchart for a data pattern identification process for data previously stored in a DSD according to an embodiment.

FIG. 6 is a flowchart for a data pattern identification process for data previously stored in DSD 106 according to an embodiment. The process of FIG. 6 can be performed by DSD controller 120 executing DSD firmware 16.

In block 602, DSD controller 120 maintains translation table 22 as described above for block 502 of FIG. 5. In block 604, DSD controller 120 performs a maintenance operation on a memory of DSD 106 such as disk pack 150 or solid-state memory 128. The maintenance operation can include, for example, a garbage collection operation for reclaiming portions of disk pack 150 or solid-state memory 128 that store obsolete data. In performing the maintenance operation, data stored in the memory is read and can be compared to one or more data patterns.

In some embodiments, DSD controller 120 may learn a new data pattern by comparing data stored in DSD 106 with other data stored in DSD 106. For example, DSD 106 may recognize a new data pattern when performing the maintenance operation. If so, DSD controller 120 may rewrite or keep only one instance of the data pattern and modify translation table 22 to map multiple logical addresses to the one copy of the data pattern.

In block 606, DSD controller 120 identifies the data pattern of the particular data previously stored in the memory as a result of performing the maintenance operation. In block 608, at least one logical address for the particular data is associated with the data pattern in translation table 22. This association may include modifying an existing entry for one or more logical addresses for the particular data to map them to a predetermined value indicating the data pattern. As with the example embodiment of FIG. 5 discussed above, the predetermined value may serve as a pointer to a definition for the data pattern in lookup table 24 or may provide a physical address for a location storing the data pattern.

In block 610, DSD controller 120 modifies translation table 22 to indicate that at least one physical address for the particular data is available for storing different data. Since the at least one logical address for the particular data now maps to the predetermined value, the old physical address or addresses where the particular data was stored becomes available for storing other data. This can ordinarily allow for conserving storage space in DSD 106 since multiple instances of different logical addresses for the data pattern can be physically stored in one location rather than multiple locations.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
a memory for storing data; and
a controller configured to:
identify a data pattern of data stored in the memory during garbage collection in the memory;
receive a write command to store write data including the data pattern previously identified during the garbage collection, the data pattern included in the write data corresponding to at least one logical address;
identify the data pattern in the write data;
consolidate the at least one logical address with one or more other logical addresses in a translation table;
indicate in the translation table that the at least one logical address is associated with the data pattern by associating the at least one logical address for the data pattern in the write data with a predetermined value stored in the translation table, wherein the predetermined value is a physical address beyond a range of available physical addresses for the DSD; and
write the write data without writing the data pattern in the memory to perform the write command.

2. The DSD of claim 1, wherein the controller is further configured to write the data pattern identified during the garbage collection in an area of the memory reserved for storing data patterns.

3. The DSD of claim 1, wherein the controller is further configured to:
generate an entry in the translation table mapping the at least one logical address to the physical address beyond a range of available physical addresses for the DSD.

4. The DSD of claim 1, wherein the write command to store the write data including the data pattern is part of a rebuild process for another DSD in a Redundant Array of Independent Disks (RAID).

5. The DSD of claim 1, wherein the write command to store the write data including the data pattern is part of a formatting process performed by an operating system of a host in communication with the DSD.

6. The DSD of claim 1, wherein the data pattern is stored within an area of the memory reserved for storing data patterns.

7. The DSD of claim 1, wherein the controller is further configured to identify a different data pattern of different data stored in the memory as a part of performing a maintenance operation on the memory.

8. The DSD of claim 7, wherein the maintenance operation is a garbage collection operation for reclaiming portions of the memory storing obsolete data.

9. The DSD of claim 1, wherein the controller is further configured to:
identify data previously stored in the memory that includes the data pattern;
modify the translation table to indicate that at least one physical address for the data previously stored in the memory is available for storing new data; and
associate, in the translation table, one or more logical addresses for the data previously stored in the memory with the data pattern.

10. The DSD of claim 1, wherein the controller is further configured to map a plurality of logical addresses to the data pattern stored in the translation table for additional data including the data pattern.

11. The DSD of claim 1, wherein the DSD further comprises at least one volatile memory configured to include a data pattern buffer and a comparison buffer, and wherein in identifying the data pattern in the write data, the controller is further configured to:
store the data pattern in the data pattern buffer;
store the write data in the comparison buffer; and
compare the data pattern stored in the data pattern buffer with the write data stored in the comparison buffer.

12. The DSD of claim 1, wherein the memory is a rotating magnetic disk.

13. The DSD of claim 1, wherein the memory is a solid-state memory.

14. The DSD of claim 1, wherein the controller is further configured to learn a new data pattern by comparing data stored in the memory with other data stored in the memory.

15. A method of managing data stored in a Data Storage Device (DSD) including a memory, the method comprising:
identifying a data pattern of data stored in the memory during garbage collection in the memory;
receiving a write command to store write data including the data pattern previously identified during the garbage collection, the data pattern included in the write data corresponding to at least one logical address;
identifying the data pattern in the write data;
consolidating the at least one logical address with one or more other logical addresses in a translation table;
indicating in the translation table that the at least one logical address is associated with the data pattern by associating the at least one logical address for the data pattern in the write data with a predetermined value stored in the translation table, wherein the predetermined value is a physical address beyond a range of available physical addresses for the DSD; and
writing the write data without writing the data pattern in the memory to perform the write command.

16. The method of claim 15 further comprising writing the data pattern identified during the garbage collection in an area of the memory reserved for storing data patterns.

17. The method of claim 15, further comprising generating an entry in the translation table mapping the at least one logical address to the physical address beyond a range of available physical addresses for the DSD.

18. The method of claim 15, wherein the write command to store the write data including the data pattern is part of a rebuild process for another DSD in a Redundant Array of Independent Disks (RAID).

19. The method of claim 15, wherein the write command to store the write data including the data pattern is part of a formatting process performed by an operating system of a host in communication with the DSD.

20. The method of claim 15, wherein the data pattern is stored within an area of the memory reserved for storing data patterns.

21. The method of claim 15, further comprising identifying a different data pattern of different data stored in the memory as a part of performing a maintenance operation on the memory.

22. The method of claim 21, wherein the maintenance operation is a garbage collection operation for reclaiming portions of the memory storing obsolete data.

23. The method of claim 15, further comprising:
identifying data previously stored in the memory that includes the data pattern;
modifying the translation table to indicate that at least one physical address for the data previously stored in the memory is available for storing new data; and associating, in the translation table, one or more logical addresses for the data previously stored in the memory with the data pattern.

24. The method of claim 15, further comprising mapping a plurality of logical addresses to the data pattern stored in the translation table for additional data including the data pattern.

25. The method of claim 15, wherein the DSD further includes at least one volatile memory configured to include a data pattern buffer and a comparison buffer, and wherein in identifying the data pattern in the write data, the method further comprises:
storing the data pattern in the data pattern buffer;
storing the write data in the comparison buffer; and
comparing the data pattern stored in the data pattern buffer with the write data stored in the comparison buffer.

26. The method of claim 15, wherein the memory is a rotating magnetic disk.

27. The method of claim 15, wherein the memory is a solid-state memory.

28. The method of claim 15, further comprising learning a new data pattern by comparing data stored in the memory to other data stored in the memory.

29. A non-transitory computer readable medium storing computer executable instructions for managing data stored in a Data Storage Device (DSD) including a memory, wherein when the computer executable instructions are executed by a controller, the computer executable instructions cause the controller to:
identify a data pattern of data stored in the memory during garbage collection in the memory;
receive a write command to store write data including the data pattern previously identified during the garbage collection, the data pattern included in the write data corresponding to at least one logical address;
identify the data pattern in the write data;
consolidate the at least one logical address with one or more other logical addresses in a translation table;
indicate in the translation table that the at least one logical address is associated with the data pattern by associating the at least one logical address for the data pattern in the write data with a predetermined value stored in the translation table, wherein the predetermined value is a physical address beyond a range of available physical addresses for the DSD; and
write the write data without writing the data pattern in the memory to perform the write command.

30. A Data Storage Device (DSD), comprising: a memory for storing data; and a controller configured to:
receive a write command to store write data including particular data, wherein the write command is part of a rebuild process for another DSD in a Redundant Array of Independent Disks (RAID);
identify a data pattern in the particular data of the write data, the data pattern in the particular data corresponding to at least one logical address;
consolidate the at least one logical address with one or more other logical addresses in a translation table;
indicate in the translation table that the at least one logical address is associated with the data pattern by associating the at least one logical address for the data pattern in the write data with a predetermined value stored in the translation table, wherein the predetermined value is a physical address beyond a range of available physical addresses for the DSD; and
write the write data without writing the particular data in the memory to perform the write command.

31. The DSD of claim 30, wherein the data pattern is stored in an area of the memory reserved for storing data patterns.

32. The DSD of claim 30, wherein the DSD further comprises at least one volatile memory configured to include a data pattern buffer and a comparison buffer, and wherein in identifying the data pattern in the particular data, the controller is further configured to:
store the data pattern in the data pattern buffer;
store the particular data in the comparison buffer; and
compare the data pattern stored in the data pattern buffer with the particular data stored in the comparison buffer.

33. The DSD of claim 30, wherein the controller is further configured to learn a new data pattern by comparing data stored in the memory with other data stored in the memory.

34. The DSD of claim 33, wherein the controller is further configured to learn the new data pattern when performing a maintenance operation.

* * * * *